3,719,730
MODIFICATION OF ALFIN POLYMERS AND PRODUCT

Virgil L. Hansley, Harry Greenberg, Fred Keith Morgan, and Lowell D. Grinninger, Cincinnati, Ohio, assignors to National Distillers and Chemical Corporation, New York, N.Y.
No Drawing. Filed Jan. 18, 1967, Ser. No. 609,998
Int. Cl. C08d 5/02; C08f 19/08, 27/10
U.S. Cl. 260—877      22 Claims

ABSTRACT OF THE DISCLOSURE

A process is provided for producing modified and graft alfin polymers by adding side chains or groups at reactive sites along the polymer chain bearing active residual alkali metal atoms attached to aliphatic carbon atoms. A compound capable of reacting with the alkali metal atoms is reacted therewith, and a substituent derived from the reactive compound is thereby attached to the polymer chain. There is also provided a branched chain alfin polymer having a plurality of randomly distributed graft branches attached to chain carbon atoms in the molecule, in an amount of one for from about each 1,000 to about 100,000 molecular weight units of a polymer.

---

This invention relates to a process for the production of modified and graft alfin polymers, and more particularly to a process for the preparation of an alfin polymer substrate using an alfin catalyst followed by introduction of substituents at the alkali metal reaction sites present in the alfin polymer.

It has long been known that conjugated aliphatic diolefins or vinyl aromatic compounds if reacted with an alkali metal can under selective conditions be dimerized (U.S. Pats. Nos. 2,816,913, 2,816,916, and 2,816,918, dated Dec. 17, 1957 to Hansley et al., and No. 3,013,071, dated Dec. 12, 1961, to Frank and Foster). The resulting compound can be carbonated to form the acid (U.S. Pat. No. 2,966,526, dated Dec. 27, 1960, to Hansley, Frank and Nobis). The process makes it possible to synthesize the higher aliphatic polyolefin hydrocarbons, such as octa-1,6-diene (U.S. Pat. No. 3,090,819, dated May 21, 1963 to Foster) by simply including a compound having an active atom in the reaction mixture.

With the development of high polymers of olefinic hydrocarbons, research was stimulated in the use of this type of reaction to prepare polymers of polyolefin hydrocarbons, such as butadiene and isoprene.

It is now well recognized that alkali metals are excellent catalysts in the polymerization of monomers to form terminally reactive polymers in which the alkali metal is found at one or both ends of the polymer chain. These polymers have been given the name "telechelic" in many of the patents in this field. "Telechelic" means there are alkali metal atoms at each end of the chain, and "semitelechelic," that there is an alkali metal only at one end of the chain. Lithium is the preferred alkali metal, but sodium and potassium are said to be useful also, although the reaction products may be less stable.

One of the earliest patents in this field is No. 3,135,716, granted on June 2, 1964, on an application filed Nov. 6, 1958, to Uraneck, Short and Zelinski. The monomers used can be a conjugated diene, such as butadiene, a vinyl-substituted olefin, such as styrene, acrylic acid esters, vinyl compounds such as vinyl chloride, and vinylidene compounds such as vinylidene chloride. The polymerization of the monomer proceeds in the presence of an organopolyalkali metal compound, having two to four alkali metal atoms, such as the reaction product of an organic polyhalide and an alkali metal, for example, 1,4-dilithobutane. The organopolyalkali compound initiates the polymerization, and the organic radical becomes incorporated in the polymer chain, with the alkali metal attached terminally at each end of the polymer chain:

$$Y\text{---}R\text{---}Y + X[C_4H_8] \rightarrow Y\text{---}R\text{---}[C_4H_6]_x\text{---}Y$$

or $$Y\text{---}[C_4H_6]_n\text{---}R\text{---}[C_4H_6]_{x-n}\text{---}Y$$

(Y is the alkali metal).

The terminally reactive alkali metal atoms can be replaced by various reagents to introduce other groups, or polymers to form block polymers. The number of possible reactions and end products is very extensive, and these form the subject of a large number of patents, of which the following are only exemplary:

| Patent No. | Date | Patentee(s) |
|---|---|---|
| 3,048,568 | Aug. 7, 1962 | James W. Cleary. |
| 3,055,952 | Sept. 25, 1962 | Earl J. Goldberg. |
| 3,074,917 | Jan. 22, 1963 | William B. Reynolds. |
| 3,078,254 | Feb. 19, 1963 | Zelinski et al. |
| 3,084,141 | Apr. 2, 1963 | Kraus et al. |
| 3,108,994 | Oct. 29, 1963 | Zelinski et al. |
| 3,109,871 | Nov. 5, 1963 | Do. |
| 3,135,716 | June 2, 1964 | Uraneck et al. |
| 3,147,313 | Sept. 1, 1964 | Henry L. Hsieh. |
| 3,150,209 | Sept. 22, 1964 | Short et al. |
| 3,157,604 | Nov. 17, 1964 | Charles W. Strobel. |
| 3,175,997 | Mar. 30, 1965 | Henry L. Hsieh. |
| 3,177,190 | Apr. 6, 1965 | Do. |
| 3,193,590 | July 6, 1965 | Do. |
| 3,214,421 | Oct. 26, 1965 | John E. Mahan. |
| 3,231,635 | Jan. 25, 1966 | Holden et al. |
| 3,240,844 | Mar. 15, 1966 | Jerry T. Gruver. |
| 3,244,664 | Apr. 5, 1966 | Zelinski et al. |
| 3,251,905 | May 17, 1966 | Do. |
| 3,235,765 | Aug. 9, 1966 | Holden et al. |
| 3,269,978 | Aug. 30, 1966 | Short et al. |
| 3,139,416 | June 30, 1964 | Lumb et al. |

The remarkable and unique characteristic of the polymers that are formed by the reaction of No. 3,135,716 is that the alkali metal is found only at the terminal ends of the chain. This makes it possible to specifically control the structure of the base polymer and locate any additions that are attached to it. The polymer itself can be attached to another polymer containing substituents such as ester, amido, cyano, keto, sulfonyl, epoxy and aldehyde groups (but not active hydrogen atoms, as in carbonyl, alcohol or amino groups), so as to form a graft polymer with the alkali metal terminated polymer as one or more side chains. This process is described in U.S. Pat. No. 3,029,221, granted Apr. 10, 1962 to Welch.

Another technique for preparing graft polymers of alpha olefins is described in U.S. Pat. No. 3,187,067, dated June 1, 1965, to Beredjick. Beredjick used a metallic derivative of styrene polymers or copolymers containing halogen in the benzene nucleus, prepared by reacting the polymer with an alkali or alkaline earth metal or organometallic compound. This polymeric metallorganic compound is used as one component of a coordinate catalyst system to effect polymerization of an alpha olefin. The second catalyst is a titanium or zirconium halide. The olefin becomes attached to the benzene nucleus of the styrene via the intermediary of the catalyst, forming polymeric side chains there. The final polymer is mostly polyolefin, containing from 1 to 10% polystyrene as the base polymer. Pats. Nos. 3,234,193 and 3,234,196, dated Feb. 8, 1966 to Leavitt describe similar lithiated polymers, in which the lithium is replaced with other organic compounds so as to form amide, ketone, alcohol, and epoxy groups on the benzene ring of the polystyrene. These polymers necessarily locate the grafted-on groups or polymers on the benzene group.

Morton and co-workers, in a series of papers in the Journal of the American Chemical Society, starting in 1947, describe an organo alkali metal catalyst for the polymerization of olefins and particularly dienes which they termed an alfin catalyst, J. Am. Chem. Soc., 69, 161;

167; 950; 1675; 2224 (1947). The name "alfin" was taken from the use of an *al*cohol and an ole*fin* in their preparation. The alcohol, a methyl n-alkyl carbinol, in the form of the sodium salt, and the olefin, also in the form of the sodium salt, from a complex that constitutes the catalyst.

These were reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in Ind. Eng. & Chem. 42, 1488–1496 (1950). There, Morton pointed out that alfin catalysts were different from other sodium compound catalysts and sodium metal in nearly every respect. They cause polymerization in minutes, whereas other sodium compounds or sodium metal require considerably more time. A few milliliters of catalyst suspension in a solution of 30 ml. of butadiene in 150 ml. of pentane will set to a solid gel within seconds, and the contents will erupt from a cork stopper bottled within about two minutes. No intermediate products can be isolated. The polymerization reaction proceeds with a high proportion of 1,4-addition, in contrast to a tendency to 1,2-addition in ordinary sodium-catalyzed polymerization.

The polymers obtained using alfin catalysts were termed alfin polymers or alfin rubbers, and contain sodium in the synthesis molecule. Because of the speed and ease of the reaction, these attracted considerable interest in the 1940's and early 1950's. However, the very speed of the reaction led to problems. The alfin rubbers had the disadvantage of having an extremely high molecular weight, generally in excess of three million, and frequently in excess of ten million. As a result, although the polymers are generally gel-free and have high tensile strength, superior abrasion resistance and tear strength, they are also very tough, and exhibit little break-down and, consequently, poor banding, on the mill. Therefore, they are difficult if not impossible to process using conventional equipment. Consequently, interest and research in the alfin rubbers has decreased in recent years, and in this original form they have found very little commercial application.

Morton, Ind. & Eng. Chem. 42 1488–1496 (1950), sought to explain the formation of an insoluble nonswelling alfin polymer as a metalation reaction. He postulated that the polymer formation involved a four-step reaction:

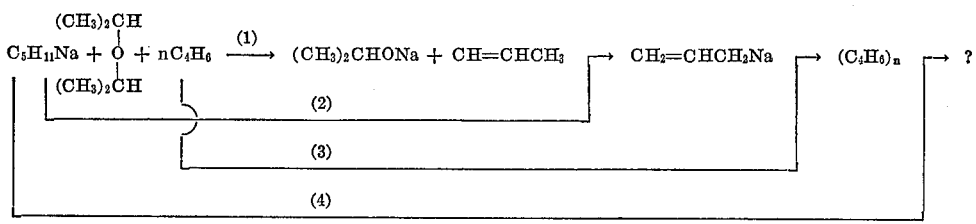

The fourth step, metalation of the polymer by amyl sodium, he considered shown by the action of amyl sodium on an alfin polymer, Morton and Ramsden, J. Am. Chem. Soc. 70 3132 (1948), Table V. He concluded, accordingly, that the final step was extensive metalation of the polymer, with formation of insoluble nonswelling product. This lends support to the view that an alfin polymer includes a proportion of sodium at points along the chain, as well as at the terminal ends of the chain, where the polymer is growing. However, metalation resulting in crosslinking and gel formation is at too late a stage in polymerization to form a useful polymer.

In an endeavor to produce commercially attractive polymers, Pfau et al., in U.S. Pats. Nos. 2,964,083, granted Dec. 13, 1960, and 3,074,902, granted Jan. 22, 1963, endeavored to reduce the working viscosity of the polymers by the incorporation of liquid plasticizers, particularly petroleum hydrocarbon oils. The resulting products were indicated to be particularly useful in the manufacture of tire treads.

Greenberg et al., U.S. Pats. Nos. 3,067,187, granted Dec. 4, 1962, and 3,223,691, granted Dec. 14, 1965, proceeded in a different direction, and sought to restrict molecular weight of the polymer by incorporation of a molecular weight modifier, a dihydroaromatic compound. These moderators were indicated to give molecular weight control over a range of about 50,000 to about 1,250,000. Greenberg et al. further showed (Rubber Age 94 87–92 (October 1963)) that this modification, unlike others previously reported, did not result in a significant change in the composition of the alfin polymer.

In accordance with the instant invention, a process is provided for preparing modified alfin polymers having one or a plurality of substituents attached to aliphatic primary, secondary or tertiary carbon atoms on the alfin polymer chain. Unlike the modified telechelic polymers, these substituents can be present at intermediate positions along the chain, as well as at terminal positions. Unlike the modified polystyrenes of the prior art, these substituents are attached to aliphatic carbon atoms of the polymer chain. Thus, the polymers of the invention can be and preferably are wholly aliphatic in nature.

The modified alfin polymers of the invention are the product of the reaction of sodium- or other alkali metal-containing alfin polymers with reactive monomers and polymers. Due to the positions of the alkali metal atoms on the chain, graft alfin polymers and copolymers are provided, as well as alfin block polymers.

As a preferred embodiment of the invention, a process is provided for preparing modified alfin polymers which retain the desirable physical properties of alfin rubbers, such as the desirable high flex values, freedom from gel, high tensile strength, superior abrasion resistance, and high tear strength, but which nonetheless possess a reasonably low molecular weight, and can be processed on conventional equipment. Such polymers can be processed to the formation of excellent quality tire tread stocks. In addition to these properties, modified alfin polymers prepared in accordance with the invention have a greater versatility and a greater variety in properties than the alfin rubbers, because the modification makes it possible to closely control physical properties within any desired limits.

The process of the invention is of especial application to the modification of alfin rubbers prepared from alfin catalysts with molecular weight modifiers.

It will be apparent, however, from the nature of the alkali metal-containing alfin polymer, that it is possible, also, in accordance with the invention to prepare a series of modified alfin polymers which are quite unlike the alfin rubbers in properties. This is possible by the selection of the substrate alfin polymer and the compound that is substituted thereon. Thus, the invention is in no way restricted to the preparation of alfin rubber-like materials. It is in fact within the scope of the process of the invention to prepare polyfunctional polymers having an alfin polymer base or substrate, having a plurality of carbon atoms on the base polymer chain to which are attached functional substituents by reaction with an alkali metal group attached to such chain carbon atoms. These carbon atoms are usually aliphatic, but in the case of alfin polystyrene and styrene-containing polymers, such carbon atoms can be aliphatic or aromatic. Such substituents can be inert, or reactive with other compounds, so as to produce interesting branched chain substituents on the base alfin polymer. If the substituent is attached via a carbon atom, a plurality of secondary, tertiary or neo-carbon branched groups are formed in the base polymer.

In accordance with the invention, an alfin polymer substrate having one or a plurality of active alkali metal atoms attached to chain carbon atoms on the base polymer chain is reacted with an alkali metal-reactive compound displacing alkali metal substituents and substituting on the substrate the substituent radical of that compound. There can in this way be introduced onto the substrate a variety of substituents, and these will constitute secondary substituents when they are attached to a primary chain carbon atom (although the substituent may be attached to the main chain at a tertiary or neo carbon atom), tertiary substituents when they are attached to a secondary chain carbon atom, and neo or quaternary substituents when attached to a tertiary chain carbon atom. The term "quaternary" is used herein generically, to encompass neo carbons.

The substituent can if desired be polymerizable, or capable of reacting with another compound to form a polymer, so that it is capable of forming a side chain or block polymer of high molecular weight. In this way there can be imposed upon the alfin substrate polymer a plurality of rather long tertiary or quaternary side chains or block polymers. These, depending upon the nature of the monomer, can be aliphatic, cycloaliphatic, aromatic, or heterocyclic, or mixtures thereof, but in all cases, of course, the base polymer molecule will be alfin. Usually, it will be aliphatic, in character, but in the case of alfin polystyrene or high styrene-diene alfin polymers, it has a mixed aliphatic-aromatic character. Thus, by a proper selection of the alfin substrate polymer, the side chains and block polymers, and the relative molecular weights of each, it is possible to produce branched chain tertiary or quaternary alfin polymers which are tailor-made for any desired purpose.

An alfin polymer is normally composed of trans-1,4, cis-1,4 and 1,2-vinyl types of polymer molecules, depending on the method used in its preparation and the configuration of the starting olefin. These are usually in the ratio of trans-1,4:cis-1,4:1,2-vinyl of 65:8:27, but these can vary to as much as 60 to 80:5 to 15:15 to 30. The process of the invention makes it possible to introduce stereospecific or non-stereospecific structures into the alfin polymer substrate, reducing or increasing stereospecificity, as desired.

The alfin polymer is believed to contain one or more alkali metal atoms attached to chain carbon atoms in the polymer chain. In the following, sodium is used as illustrative:

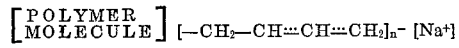

It will of course be understood that the polymer molecule may also contain one or a plurality of nonterminal sodium groups in the chain.

In the reaction of the invention, these sodium (or other alkali metal) groups are substituted by another group, derived from a compound reactive with an organo alkali metal compound, such as an organic monomeric compound which is capable of polymerization to form a long side chain on the polymer molecule. The following reaction with butadiene is illustrative:

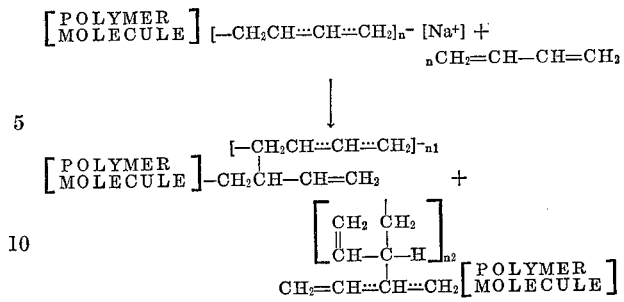

In this reaction, $n$, $n_1$ and $n_2$ represent the number of butadiene units in the 1,4- and 1,2-polymeric chains that become attached to the carbon formerly bearing the sodium atom. There can of course be a plurality of such chains in the final molecule, corresponding to the number of sodium groups reacted. Mixed 1,2- and 1,4-chains do occur; the microstructure is high vinyl, like, for instance, sodium butyl polymer which is trans-1,4:cis-1,4. Vinyl is about 20:20:60. They are not primarily pure stereospecific in nature.

If desired, the number of substituent alkali metal atoms can be increased. This is not necessary, but if the alfin polymer has deficiency of reactive alkali metal sites to permit the degree of modification desired, it may be expedient to do so. For this purpose, the alfin polymer can be reacted with an alkali metal hydrocarbide.

The amount of alkali metal that is introduced in or present in the form of reactive groups into an alfin polymer substrate need not be large. As little as one equivalent of alkali metal per 100,000 molecular weight units of alfin polymer will give a modified product having noticeably improved properties. As much as one equivalent of alkali metal per 1000 molecular weight units of polymer can be employed, if desired. The amount used will depend upon the extent of modification desired, and the nature of the substitutent and its molecular weight that is introduced.

The alkali metal hydrocarbide can be any alkali metal hydrocarbide capable of reaction with an active, i.e., a primary, secondary or tertiary, hydrogen attached to a carbon atom. Sodium is a preferred alkali metal, but potassium can in most cases be used as a substitute for sodium, inasmuch as it is only in a few instances that sodium and potassium differ appreciably in their reactivity and in the kinds of products that they produce. Caesium and rubidium may also be employed. Lithium is usually inactive, inasmuch as it does not tend to form nonterminal lithium groups through the transmetalation reaction.

Any alkali metal hydrocarbide can be employed, with the above restrictions. The hydrocarbon radical thereof is normally an alkyl group having from four to about ten carbon atoms. However, aromatic groups also can be employed, and cycloaliphatic groups are frequently effective as well. Typical groups include n-butyl, isoamyl, isobutyl, isohexyl, isooctyl, n-amyl, n-hexyl, n-heptyl, n-octyl, n-nonyl, n-decyl, phenyl, xylyl, tolyl, and cyclohexyl.

Exemplary alkali metal hydrocarbides are butyl sodium, butyl potassium, isoamyl sodium, n-amyl potassium, hexyl sodium, 2-ethyl-hexyl sodium, dodecyl sodium, iso-nonyl potassium, decyl potassium, phenyl sodium, phenyl potassium, benzyl sodium, cyclohexyl sodium, cyclopentyl potassium, and phenethyl potassium, n-amyl caesium, and phenyl caesium, hexyl rubidium and phenyl rubidium.

In many cases, it is possible to employ the alkali metal as the free metal in the presence of the organic compound that is to be reacted with the substrate alfin polymer. In this case, the alkali metal hydrocarbide may perhaps be formed as an intermediate in the coupling reaction that takes place. Whatever the mechanism may be, the radical of the organic substituent-forming compound does become attached to the substrate alfin polymer in a nonterminal position, and if it is a monomer, it can polymerize to form the desired intermediate side chain.

It is important that the alfin polymer be reacted before the alkali metal atoms are removed, after polymerization is complete and the reaction mixture is quenched to arrest the reaction. Thus, the alfin polymer should be in the cement stage, before curing and cross-linking is effected. In this stage, the alfin polymer is still reactive with the organic substituent-forming compounds.

As the organic substituent-forming compound there can be employed any compound capable of reacting with an alkali metal atom directly attached to carbon. If it is a monomer, and polymerization is desired, it is itself polymerizable in the presence of an alkali metal hydrocarbide or free alkali metal, or the alkali metal-containing alfin polymer. These compounds contain as component radicals the substituent radical itself and another group that is reactive with the alkali metal and in many cases (but not all) is lost to the alkali metal, to form an alkali metal compound as a by-product, while the substituent radical becomes attached to the alfin polymer substrate. Alkali-metal-reactive groups that can be present on these compounds include halide, for instance, chloride, bromide and iodide, olefinic carbon-to-carbon double bonds having a reactive hydrogen or halide atom on a carbon atom thereof, thio groups, hydroxyl groups, keto groups, acid halide groups, acid groups, amide and amino groups, and cyclic-1,2-oxyether groups, as in the alkylene oxides.

An olefin can be introduced that is different from that used in making the alfin rubber. The olefins are conjugated, and can have from about four to about twenty carbon atoms and from two to four olefinic groups. Of these, at least two must be conjugated. The higher the molecular weight, the slower the reaction that takes place, so consequently it is preferred that the olefin have less than ten carbon atoms.

Typical conjugated olefins include 1,3-butadiene, isoprene, 2,3-dimethylbutadiene, piperylene, dimethylpentadiene, methyl isoprene, 1-phenyl-butadiene and divinyl benzene. Styrene and alkyl-substituted styrenes such as α-methyl styrene and the dimethyl styrenes can also be employed. Higher trienes and tetraenes includes dibutadiene and 1,3,5-hexatriene.

Other types of alkali metal-reactive monomers also can be employed.

Carbon disulfide will produce dithiocarboxy derivatives of the olefin substrate polymer. The dithiocarboxy groupings which then result along the chain can be further reacted, using reactants reactive with

groups, such as alcohols, to produce thioesters. Acid chlorides and diacid chlorides will give keto rubbers. Diacid chlorides will react with glycols to give polymeric side chains with ester groups; thus, for example, succinic acid chloride, adipic acid chloride, malonic acid chloride, glutaric acid chloride, epoxides, like ethylene oxide, propylene oxide, can be reacted to produce polymeric ketonic and hydroxyl side chains.

Aliphatic, cycloaliphatic and aromatic halides can react, and in some cases form substituent chains of considerable length. Thus, for instance, ethyl chloride and ethylene dichloride, cyclohexyl chloride, 1,4-dichlorocyclohexyl chloride, α,β-dichloroethyl benzene, chlorobenzene and paradichlorobenzene can be used to produce monomeric and polymeric aliphatic and aromatic substituent chains.

Elemental sulfur can be reacted with the alkali metal groups to produce mercapto groups, which can then be modified by further reaction to produce substituent chains linked to the alfin polymer substrate by sulfur ether groups. In this way, sulfur-containing rubbers can be obtained. Oxygen will react to give peroxides or a primary product, decomposable to ketones and alcohols.

Compounds having the structure $XNR_1R_2$ where X is halogen, such as chlorine, bromine or iodine, will give disubstituted amino substituent chains on the alfin polymer substrate. These also have unusual properties, and can be further reacted if desired, depending upon the nature of $R_1$ and $R_2$, to produce lengthy substituent chains linked to the alfin polymer substrate by a nitrogen atom.

Similarly, sulfinic and sulfonic groups attached to the alfin polymer substrate can be obtained by reacting the alfin polymer with $SO_2$, $SO_2Cl_2$, $SOCl_2$ and like compounds. Chlorine, bromine or iodine can be reacted with the alkali metal to give a halogen-containing alfin polymer, and these also can be further reacted to produce substituent groups.

Alkylene oxides such as ethylene oxide, propylene oxide, 1,3- and 1,2-cyclohexane oxide, butylene oxide-1,3 and -1,2, butadiene oxide, styrene oxide, and the like, or fully substituted acetones, react with the alkali metal groups to create compounds containing one hydroxyl group for each alkali metal present. Such polymers have desirable properties because of the presence of the hydroxyl group, and this group can itself be reacted with other materials, such as acids, and acid chlorides, to produce interesting substituent chains. If the acid or acid chlorides are polyfunctional, and a glycol is included as well, polymeric ester substituent chains will be obtained.

It is apparent from the above that the process of the invention has considerable versatility, and can be used to produce a wide variety of polymers, based on the alfin substrate polymer. These polymers will be block copolymers, when the substituent chain is attached to a terminal carbon atom, or graft copolymers when the substituent chain is attached to an intermediate chain carbon atom.

The alfin polymer base can be tailor-modified with a polymerizable monomer as desired to introduce any amount of non-stereospecificity or, predominantly vinyl structure in the substituent chains, so as to modify the properties of the alfin polymer to the extent desired. This could hardly be done by copolymerization of the monomer used for the substituent chain and the monomer used for the alfin polymer chain, inasmuch as it would then be impossible to produce a stereospecific substituent polymer. The alfin polymer, inasmuch as it forms the backbone of the entire molecule, is primarily responsible for the properties of the final product, but these properties will of course be modified in a subtle manner by the number and type of substituent chains that are introduced, and their average molecular weight.

Illustrative alfin polymer substrates are trans-rich alfin polybutadiene, trans-rich alfin polyisoprene, alfin polystyrene, alfin poly-2,3-dimethyl-butadiene, alfin polypiperylene, alfin poly-α-methyl styrene, alfin polyvinyl naphthalene, alfin polyisobutylene, alfin poly-1,3-pentadiene, alfin poly-4-methyl-1,3-pentadiene, alfin poly - 2-methyl-1,3-pentadiene, alfin butadiene-styrene copolymer, and alfin isoprene-styrene copolymer.

The proportion of organic compound reacted with the alkali metal groups on the alfin polymer also can be varied greatly, and is in no way critical. As little as 0.01% by weight of the alfin polymer may, depending on what it is, noticeably modify the properties of the polymer. There is no real upper limit on the amount of substituent that can be introduced, but of course when the amount is very high the original properties of the alfin polymer substrate may be so modified as to virtually disappear, the resulting product displaying primarily the characteristics of the substituents instead. If, for example, the combined molecular weight of the substituent chains is much greater than that of the alfin polymer, then obviously the properties of the substituent chains can greatly outweigh the properties of the alfin polymer.

Thus, usually the amount of substitutent that is introduced will not exceed about 200% by weight of the alfin polymer. Preferably, the amount of substitutent is within the range of about 10 to about 150%, for an eventual substitutent that is polymeric in nature, such as an olefin, or vinyl compound, and within the range from about 0.01 to about 5%, for a substituent that is monomeric in nature, such as a halogen atom, an epoxide group, a thioacid group, and a carboxylic acid group.

Any reaction between the alfin polymer substrate and an alkali metal hydrocarbide and the reaction of the alfin polymer containing alkali metal with the organic substituent-forming compound are most conveniently carried out in the presence of an inert organic solvent, although if one or more of the reactants are liquid at the reaction temperature, a solvent may not be necessary. The solvent must be non-polar, unless it is the monomer itself. The solvent that is most desirable for a particular type of polymer is best determined by trial and error. The concentration of the reactants in the solvent is in no way critical, and can range from as little as 5% to as much as 80%, depending upon solubility of the reactants and the reaction products.

Exemplary solvents are the paraffinic hydrocarbons, such as hexane, octane, isooctane, nonane; aromatic hydrocarbons such as benzene, toluene, mesitylene, xylene, and ethyl benzene; cycloaliphatic hydrocarbons such as cyclohexane, and the naphthenes; and the petroleum-derived solvents such as the petroleum ethers. Mono olefins are suitable as solvents, such as 2-butene. The solvent should of course be a liquid under the reaction conditions, which include superatmospheric pressure.

The reaction system must be anhydrous, and oxygen must be excluded. An inert atmosphere is necessary; any inert gas can be used, such as nitrogen, helium, and argon or the reaction can be done in a vacuum system with only the vapor pressure of solvent in the free space over the reacting medium.

The reaction proceeds best at an elevated temperature, although in many cases a slow reaction at room temperature will be observed. The preferred reaction temperature is within the range from about 50 to about 70° C. It is not normally desirable to exceed 100° C., because of complicated side reactions which may then occur, but if the reaction is carefully watched, it may be possible to use temperatures as high as 150 or 200° C., in some cases.

The reactions with the alkali metal hydrocarbide, if any, and with the organic substituent-forming compound proceed rather rapidly, and can be complete in as little as one or two hours. Reaction times in excess of about eight to ten hours are not usually required.

Upon completion of the reaction, the modified alfin polymer can be precipitated from the reaction solution or mixture by addition of a non-solvent for the polymer, such as an aliphatic alcohol or acetone. The precipitated material can then be removed by centrifuging or by filtration, and, after washing, is ready for processing.

The following examples in the opinion of the inventors represent preferred embodiments of the process and product of the invention.

EXAMPLE 1

An alfin rubber was prepared as follows. An alfin catalyst was prepared by charging 660 cc. of dry hexane into a 3-necked flask provided with stirrer, Dry Ice, reflux condenser and a water-cooling bath. To this was added 96.6 grams of finely divided sodium (1.2 gram atoms), dispersed in Sinclair light alkylate as a 28.6% dispersion. Isopropyl alcohol (0.4 mol.) was added to this dispersion over a period of twenty minutes, and permitted to react for twenty-five minutes more at ambient temperature and without cooling. n-Butyl chloride (44.5 g., 0.42 mol.) was then added over a period of twenty-five minutes. Stirring was maintained for an additional hour, without cooling. Excess dry propylene (C.P. grade) was subsequently introduced into the mixture, which was maintained under reflux for twelve hours. The preparation was permitted to degas (removing propylene) at room temperature. The reaction slurry or catalyst was then transferred to a storage vessel under inert gas, and diluted with sufficient dry hexane to make 1120 grams (1600 ml.). This slurry contained 0.4 mol. sodium isopropoxide, 0.4 mol. allyl sodium and 0.4 mol. sodium chloride.

To 105 parts of dry hexane in a polymerization bottle at about −15° C. were added 30 parts of butadiene gas.

The alfin catalyst (17.5 parts) was then added to the hexane-butadiene solution containing 2.4 parts of 1,4-dihydrobenzene as moderator. The system under an atmosphere of nitrogen was maintained at room temperature with vigorous shaking until solid. After two hours reaction the system was opened, a sample was removed for analysis, the reaction mixture was cooled to −20° C., and 15 parts of isoprene gas was introduced. The tube was warmed to 75° C., and the polymerization of the isoprene with the alfin trans-rich polybutadiene allowed to proceed for four hours. The product was then precipitated by the addition of ethanol, and worked up by washing with ethanol and water in a Waring Blendor. The washed polymer, after vacuum drying, weighed 40 grams. A 98% yield based on both charged monomers was obtained. The polymer had a molecular weight in excess of 0.1 million (intrinsic viscosity: 1.5).

The microstructure of the modified polymer is shown in Table I, in comparison with the original alfin polymer:

TABLE I

| Percent | Trans-1,4 | Vinyl (-1,2 and -3,4) | Cis 1,4 |
| --- | --- | --- | --- |
| Alfin catalyst | 65 | 27 | 8 |
| Sodium polymerized polyisoprene | 43 | 57 | 0 |
| Graft polymer | 58 | 37 | 5 |

EXAMPLE 2

A polymerization tube having a capacity of about 300 ml. was dried and purged with purified nitrogen. After rinsing the tube with a dilute alfin catalyst solution to clean glass walls etc., a quantity of 150 ml. of commercial hexane, pretreated with 3A molecular sieve and silica gel, was added to the vessel. Then 8.9 g. of 80.9% 1,4-dihydrobenzene solution, containing 7.2 g. of 1,4-dihydrobenzene (0.09 mol.), was introduced and then 30.2 g. of 1,3-butadiene was condensed into the hexane at −20° C. The pressure in the tube was equalized with nitrogen at atmospheric pressure and 5.25 ml. of standard alfin catalyst (0.00025 molar sodium alkyl) was added. The tube was agitated for 20 minutes, cooled to −20° C. and 50 ml. of $CO_2$ gas containing 0.05 millicurie of $C^{14}$ introduced into the tube. The $CO_2$ was allowed to react overnight to complete carbonation. 20 ml. of 1 N NaOH was added to fix the unreacted $CO_2$ gas as carbonate. The modified alfin polymer was washed several times with distilled water and shredded in a Waring Blendor. The rubber was redissolved and precipitated twice from toluene using alcohol, followed by washing with water and acetone. The vacuum dried product weighed 23.4 g. (77.5%) and had an intrinsic viscosity of 2.1, which was equivalent to a 200,000 weight (average molecular weight). The calculated specific activity was found to be $2.95 \times 10^{-1}$ microcurie per gram of rubber, which is an average of an equivalent weight of 77,500

11

(i.e. grams of rubber per mole of $CO_2$). This is again a number average molecular weight and relates only approximately to the 200,000 weight average value. The rough inference, however, is that there was more than one sodium atom per effective polymer chain.

This alfin polymer containing carboxy groups was cured as follows. A preadduct was prepared by degassing the reactive polymer by evacuating at 230° F. for two hours, after which a curing agent was stirred in and the mixture was heated at 230° F. for various lengths of time as indicated in the table. The polymer was then removed to a 2 inch roll mill and carbon black and more curing agent were added. All the samples were cured between thin sheets of aluminum. The polymer was first cured partially for 30 minutes at 230° F. with 60 equivalent weight percent of hexa-2-methylaziridinyl triphosphatriazine. The partially cured polymer was then milled with 50 phr. of a high abrasion furnace black (Philblack O) and cured for 60 minutes at approximately 240° F. The cured product had good elongation and a low inverse swelling ratio.

EXAMPLE 3

In order to obtain enough alfin polymer to conduct milling or stability tests on resultant polymers, a different type of polymerization procedure was used.

The basic polymerization unit is a standard water jacketed Day mixer, having a 25 liter capacity. The top is closed with a ⅜ inch Plexiglas plate having brass and stainless steel fittings for the introduction of the various reactants. Provision was made for (1) $N_2$ and 1,3-butadiene, (2) isoprene, (3) moderator solution, (4) polymerization solvent, (5) reflux condenser, (6) catalyst and (7) liquid and gaseous terminator entry ports. The monomers, moderator solution and $N_2$ additions are regulated by metering through flowmeters. The alfin catalyst is metered using a timer controlling a solonoid valve. The temperature is recorded on an automatic recorder from a thermocouple extending into the polymerization mixture. The product rubber cement is either pumped, pressured or allowed to fall by gravity through a ¾ inch pipe in the bottom of the mixer chamber into a crumb former apparatus which produces a granular product easily washed and freed of solvent by steam distillation.

(a) Eleven liters of molecular sieve and silica gel dried "Sinclair Light Alkylate" was pumped into the Day mixer and 155 g. of 1,3-butadiene was fed to this solvent. Slow addition of 125 ml. of double strength alfin catalyst was made to determine the "flock point." After mixing for 25 minutes, simultaneous addition of 400 g. of 1,3-butadiene, 105 g. of isoprene, 540 ml. of a solution of 5.7 g. of 1,4-dihydronaphthalene in "Sinclair Light Alkylate" and 108 ml. of alfin catalyst was made over a period of 0.5 hour. The reaction temperature rose from 29° to 41° C. with continuous cooling. The polymerization mixture was stirred for an additional 15 minutes before termination with gaseous carbon dioxide. This cement was then pumped into the crumb former. The rubber was then washed with water, antioxidant added and dried to constant weight on a standard 12 inch rubber mill at 250° F. The weight of product was 546 g. (83.0%), ML–144, 89.

(b) In a similar experiment to produce the butadiene isoprene copolymer, a cement was made which was terminated by feeding the cement directly into the crumb former.

The milling of the carboxylated rubber sample was done on the rubber mill at 250° F., taking the Mooney viscosity of the sample after each of three 10 minute milling periods. It was found that the carboxy rubber product was stable, i.e., no significant Mooney viscosity change occurred. The control experiment on the mill was a water "terminated" (i.e. hydrogen) alfin gum.

12

TABLE II.—BREAKDOWN OF ALFIN RUBBER BY MILLING (STABILIZED WITH 2% PBNA)[1]

| | Mooney ML–1+4 at— | |
|---|---|---|
| Total mill time minutes | (212° F.) (a) $CO_2$ | (212° F.) (b) $H_2O$ |
| Initial | 89 | 83.5 |
| 10 | 88 | 83.5 |
| 20 | 87 | 80.0 |
| 30 | 84 | 77.0 |

[1] N-phenyl-2-naphthylamine; supplied by Matheson, Coleman and Bell Company.

EXAMPLE 4

In a polymerization similar to that of Example 3, 125 ml. of alfin catalyst was added to titrate the 11 liters of polymerization solvent to remove trace substances which would inactivate "working" alfin catalyst. Simultaneous addition of 800 g. of 1,3-butadiene, 375 g. of isoprene, 1 liter of a "Sinclair Light Alkylate" solution of 15.2 g. of 1,4-dihydronaphthalene and 180 ml. of alfin catalyst was made over one hour. There were 2–25 ml. extra portions of catalyst added after 22 and 45 minute reaction time for a total of 230 ml. of catalyst added. This polymerization mixture was allowed to stir for an additional hour. The resulting butadiene-isoprene copolymer cement was divided into two portions; one was carbonated and the other terminated with water. Both samples were washed and dried to constant weight on a rubber mill at 250° F. Both were stable in the presence of antioxidant (PBNA).

TABLE III.—BREAKDOWN OF ALFIN RUBBER BY MILLING

| | Mooney ML–1+4 at— | |
|---|---|---|
| Total mill time minutes | (212° F.) (a) $H_2O$ | (212° F.) (b) $CO_2$ |
| Initial | 49 | 42 |
| 10 | 46 | 90 |
| 20 | 46 | 38 |

EXAMPLE 5

An alfin polymer was prepared. The procedure followed was the same as that described in Example 1. A portion of the reaction mixture was terminated with isopropyl alcohol to provide a sample of the alfin rubber for comparative purposes. The remainder was added slowly to an excess of 0.30 molar $SiCl_4$ and the reaction mixture was allowed to stand one hour at 122° F. The solution became viscous. The mole ratio of alfin polymer:$SiCl_4$ was 1:21. The product was believed to be $Cl_3Si$-alfin polymer-$SiCl_3$.

The $SiCl_4$-treated polymer solution was reacted with water, ethylene glycol, and tetraethylenepentamine. The temperature of each mixture was held at 122° F. for one hour following addition of the treating agent.

Treatment of this reaction product with water at 122° F. resulted in a cross-linked, silicic polymer. Cross-linked products also resulted when ethylene glycol and tetraethylenepentamine were used as treating agents.

EXAMPLE 6

Two graft polymer products were formed having the principal structure, alfin polymer-polyisoprene-alfin polymer. The first polymer substrate was formed by the procedure of Example 1. Next, isoprene was injected into the system together with isopentane (70/30, cyclohexane/isopentane) and polymerization continued at 55–57° C.

EXAMPLE 7

An alfin rubber was prepared as in Example 1. The unquenched polymer solution was treated with 120.0 mmoles of ethylene oxide, added as a 5 molar solution in cyclohexane. The mixture was heated at a temperature ranging from 110 to 160° C., with stirring, for 4 hours. It was then acidified with hydrochloric acid, washed with water, and solvent evaporated. Inherent viscosity and gel determinations were made on the polymer before and after treatment with ethylene oxide.

To two grams of the hydroxy-containing polymer 0.14 gram of PAPI (a polyaryl polyisocyanate) having the formula

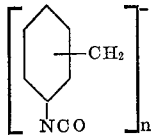

was added and the mixture was heated at 160° F. for 96 hours. Results of inherent viscosity, gel and swelling index determinations indicated that the polymer contained hydroxy groups and was cured when heated with the polyisocyanate curative.

EXAMPLE 8

Unquenched alfin polymer solutions prepared according to Example 1 were treated with sulfur, oxygen, or carbon dioxide. Treatment involved replacement of the alkali metal substituents on the polymer chains by active groups. Variable amounts of a solution of elemental sulfur in dry benzene were added to three polymerization bottles. The systems were agitated for 12 hours at 50° C. Addition of sulfur caused the reaction mixtures to set up immediately. The polymers were carefully isolated and the excess sulfur was removed by heating the products with an aqueous solution of sodium carbonate. Sulfur was used as a slurry in toluene for treating the polymer in another run. Otherwise the procedure was the same as before.

Treatment of the unquenched polymer solutions with oxygen was carried out by injecting oxygen into each reaction mixture at room temperature. The material was then acidified with HCl and the organic layer washed with water. The polymeric product was separated by coagulation with isopropanol.

Treatment with carbon dioxide was effected either by pouring the unquenched polymer solution onto Dry Ice or by injecting carbon dioxide gas and polymer solution under pressure into separate arms of a T-tube which provided a means for bringing the gas into contact with the polymer. Carbon dioxide gas also was used. Following treatment by either method, acid was added and the organic layer was washed with water. The polymer was recovered either by evaporation of the solvent or by coagulation with isopropanol. Acetic acid was used to acidify the reaction mixture in one run. Hydrochloric acid was used in the remaining runs.

The alfin rubber containing carboxy end groups was compounded in accordance with the following formulation:

| | Parts by weight |
|---|---|
| Rubber | 100 |
| High abrasion furnace black (Philblack O) | 50 |
| Zinc oxide | 3 |
| Stearic acid | 2 |
| Flexamine [1] | 1 |
| Resin 731 [2] | 3 |
| Santocure [3] | 1 |
| Sulfur | (4) |
| Tolylene-2,4-diisocyanatediphenylamine adduct | 3 |

[1] Physical mixture containing 65 percent of a complex diarylamine-ketone reaction product and 35 percent of N,N'-diphenyl-p-phenylenediamine.
[2] Disproportionated rosin acid.
[3] N-cyclohexyl-2-benzothiazylsulfenamide.
[4] 1.1, 1.3, 1.5, 1.7.

The carboxy-containing alfin was compounded on a roll mill using variable sulfur loadings as indicated. The compounded stocks were cured 30 minutes at 307° F. and swelling, resilience, and heat build-up data were obtained.

Comparisons made at similar $V_r$ values showed that the carboxy-containing polybutadiene has higher resilience and lower heat build-up than the unmodified alfin rubber.

These polymers can be used in the fabrication of tires, gaskets, tubing, insulation, foamed products, etc.

EXAMPLE 9

An alfin rubber was prepared as in Example 1. After polymerization was complete, 40 millimoles of 4-dimethylaminobenzaldehyde was added as a 0.5 molar solution in toluene. The mixture was stirred and the temperature was maintained at 50° C. Another 40 millimole portion of 4-dimethylaminobenzaldehyde was added after one hour and the mixture again stirred and allowed to react for an hour. The reaction mixture was then washed with three 100 milliliter portions of water, coagulated with isopropanol, and the liquid polymer was separated and dried overnight. Titration of a benzene solution of the product with perchloric acid in glacial acetic acid showed that 42 millimoles of base were present per 100 grams of polymer.

The dimethylaminobenzaldehyde-treated polymer which contained both hydroxy and tert-amino terminal groups was cured with tolylene-2,4-diisocyanate alone (a curative for a hydroxy group) and with a mixture of tolylene-2,4-diisocyanate and α,α'-dichloro-p-xylene (the latter is a quaternizing agent for the tert-amino groups), using one equivalent of reactant per end group with which it would react. One run was made in which the polymer was heated at the curing temperature but no curative was added.

Cross-linking occurred as evidenced by the presence of gel. The data illustrate the dual effect of the diisocyanate and halogen-containing compound acting together in comparison with the diisocyanate acting alone.

EXAMPLE 10

The procedure described in Example 1 was followed to make an alfin rubber. At the end of the polymerization, a 20-milliliter sample was withdrawn from each bottle, coagulated with isopropanol, 4,4'-thio-bis(6-tert-butyl-metacresol) was added, and the products were vacuum dried. The products were white rubbery materials.

The remaining unquenched polymer solutions were treated with 25.0 millimole per 100 parts of monomer of a 0.3 molar solution of bis(chloromethyl) ether in cyclohexane. Time allowed for the reaction was 24 hours and the temperature was 50° C. While solid products were obtained after coagulation of the polymers with isopropanol and drying them in vacuo.

The marked increase in inherent viscosity after treatment with bis(chloromethyl) ether was evidence that coupling occurred. The products were gel-free and were, therefore, not cross-linked.

EXAMPLE 11

An alfin polymer was prepared as in Example 1. The polymer was treated by the addition of about 17.6–19.8 parts (0.4–0.45 mole) of ethylene oxide in about 30 seconds. The very thick mass is allowed to warm up to room temperature over a period of 3–4 hours. The deep red color of the reaction mass disappears after the mass had been allowed to stand at room temperature overnight. The polymer was purified and isolated by addition of water.

To a solution of 33.5 parts (0.01 mole) of the hydroxyl-terminated alfin polymer in 31 parts of anhydrous tetrahydrofuran is added 1.63 parts (90% theory of 0.0104 mole) of toluene-2,4-diisocyanate, 0.006 part iron acetylacetone (10% solution in acetone), and 0.013 part of triethylamine. The mixture obtained is agitated for 26 hours at 25–27° C. The viscosity increases for about 16–18 hours and then appears to remain unchanged. Half the mixture obtained is poured into methanol. The polymer, which precipitates, is dried to constant weight under vacuum. The remaining half of the mixture is treated by the addition of 1 part of water in 9 parts of tetrahydrofuran and subsequent agitation at room temperature for 46 hours.

33.5 parts (0.01 mole) of the hydroxyl-terminated polybutadiene is molecular weight-extended with the theoretical amount—1.81 parts (0.0104 mole) of toluene-2,4-diisocyanate by both procedures described above.

EXAMPLE 12

An alfin polymer was prepared as in Example 1. After the polymerization was complete the reaction mixture was cooled, with agitation, to 5° C. and 40 millimoles of 1,2-dithiane as a 0.5 molar solution in toluene was added slowly with agitation. During the reaction with 1,2-dithiane, the temperature was controlled with a 5° C. bath. Clear, water white clumps of material formed upon the addition of 1,2-dithiane, and as the reactions approached completion, the mixtures set up. Four hours was allowed for each reaction.

Ten milliliters of glacial acetic acid was added to each reaction mixture while the temperature was maintained at 5° C. The mixture which had set up became fluidized upon addition of the acid. This treatment converted the mercaptide groups to mercapto (SH) groups and sodium acetate precipitated.

The product from each run was isolated by precipitation in isopropanol with one part by weight of antioxidant AO-2246 (2,2'-methylene - bis(4-methyl-6-tert-butylphenol) added per 100 parts by weight of monomer charged. The isopropanol was decanted and each product was dried under reduced pressure in a nitrogen atmosphere.

The polymers were heated at 298° F. for 1.2 hours, and became hard, self-cured solids.

The alfin polymers modified in accordance with the invention have in general the utilities of the alfin polymer starting materials from which they are prepared, but their improved properties may increase the range of utility and/or may improved their suitability for the general end uses of such polymers. Thus, for example, the rubber-like materials produced in accordance with the invention are useful in the manufacture of tires for vehicles of all kinds, as gasketing materials, and as materials of construction, where the physical properties of the alfin polymers are desirable.

In many cases, the improved alfin polymers will have utilities that the starting materials did not have, because of some difficult physical property. For example, by grafting substituent chains of appropriate microstructures in accordance with the invention at numerous points on the alfin polymer substrate, the polymer can be internally plasticized, and the tough products made available in a host of new applications, such as mechanical rubber goods and vehicle tires, to mention but two.

The grafting of functional groups in accordance with the invention can change the elastomer response of alfin polymers. Introduction of substituent groups having epoxy linkages can produce elastomers which have better adhesive properties, and which can be cross-linked to yield rigid structures, by reaction of the side chain epoxy groups. Moisture permeability can thus be improved, if desired.

Additional vulcanizability can be introduced by grafting short polybutadiene chains onto these polymers, in accordance with the invention. It will be apparent from the preceding description that in this way tailor-made products for specific uses in the elastomer field can be prepared at a relatively low cost.

Having regard to the foregoing disclosure, the following is claimed as the inventive and patentable embodiments thereof:

1. A process for the preparation from alfin monomers of modified alfin polymers having substituent groups introduced at sodium atom sites in the polymer molecule, the sodium atoms at such sites being derived from alfin catalyst during polymerization of alfin monomer, and being attached to intermediate aliphatic chain carbon atoms, comprising blending an organic unsaturated alfin monomer, alfin catalyst, and solvent, effecting the polymerization of alfin monomer at an elevated temperature at which the reaction proceeds, separating volatile materials including unreacted monomer and solvent, and recovering alfin polymer from the alfin polymer reaction mixture without quenching the reaction mixture in water, and then reacting the alfin polymer with an organic compound reactive with sodium atoms attached to carbon to effect replacement of the sodium, and attach to the polymer molecule via the intermediate aliphatic chain carbon atoms organic substituents derived from the compound.

2. A process in accordance with claim 1, in which supplemental sodium atoms are introduced by reaction of the polymer with a sodium hydrocarbide at a temperature and for a time to effect replacement of active hydrogen attached to intermediate aliphatic chain carbon atoms in the polymer by sodium atoms in the proportion of one equivalent for from about 1000 to 100,000 molecular weight units of the alfin polymer.

3. A process in accordance with claim 2, in which the active hydrogen is a primary hydrogen.

4. A process is accordance with claim 2, in which the active hydrogen is a secondary hydrogen.

5. A process in accordance with claim 2, in which the active hydrogen is a tertiary hydrogen.

6. A process in accordance with claim 2, in which the sodium hydrocarbide is an alkyl sodium.

7. A process in accordance with claim 2, in which the sodium hydrocarbide is an aryl sodium.

8. A process in accordance with claim 1, in which the organic compound is a conjugated polyolefin.

9. A process in accordance with claim 8, in which the olefin is polymerized and forms a chain of high molecular weight.

10. A process in accordance with claim 1, in which the substituent is an alkyl group.

11. A process in accordance with claim 1, in which the substituent is an aryl group.

12. A process in accordance with claim 1, in which the substituent comprises a group reactive with an organic compound.

13. A process in accordance with claim 12, in which the group is

14. A process in accordance with claim 12, in which the group is

15. A process in accordance with claim 12, in which the group is OH.

16. A process in accordance with claim 12, in which the substituent is an organic acid group which is reacted with an isocyanate forming a polyurethane chain on the alfin polymer.

17. A process in accordance with claim 1, in which the reaction temperature is within the range of from about 50 to about 150° C.

18. A process in accordance with claim 1, in which the reaction is carried out in the presence of an inert organic solvent.

19. A process in accordance with claim 1, in which the organic compound is employed in an amount to attach to the polymer molecule an amount of substituent within the range from about 0.01 to about 200% by weight of polymer.

20. A modified alfin polymer prepared in accordance with the process of claim 1.

21. A process for the preparation from alfin monomers of modified alfin polymers having substituent groups introduced at sodium atom sites in the polymer molecule, the sodium atoms at such sites being derived from alfin catalyst during polymerization of alfin monomer, and being attached to intermediate aliphatic chain carbon atoms, comprising blending an organic unsaturated alfin monomer, alfin catalyst, and solvent, effecting the polymerization of alfin monomer at an elevated temperature at which the reaction proceeds, separating volatile materials including unreacted monomer and solvent, and recovering alfin polymer from the alfin polymer reaction without quenching the reaction mixture in water, and then reacting the alfin polymer with a compound reactive with sodium atoms attached to carbon and selected from the groups consisting of $CO_2$, $CS_2$, $O_2$, S, $SO_2$, $SO_2Cl_2$, $SOCl_2$, $Cl_2$, $Br_2$, and $I_2$, to effect replacement of the sodium, and attached to the polymer molecule via the intermediate aliphatic chain carbon atoms a substituent derived from the compound.

22. A modified alfin polymer prepared in accordance with the process of claim 21.

References Cited

UNITED STATES PATENTS

| | | | |
|---|---|---|---|
| 3,187,067 | 6/1965 | Beredjick | 260—877 |
| 3,234,196 | 2/1966 | Leavitt | 260—935 |

FOREIGN PATENTS

| | | | |
|---|---|---|---|
| 1,151,660 | 7/1963 | Germany | 260—879 |
| 873,656 | 7/1961 | Great Britain | 260—879 |

OTHER REFERENCES

Morton et al., Action of Metalating on Rubber, J. Am. Chem. Soc., vol. 70, 3132–3135, September 1948.

MURRAY TILLMAN, Primary Examiner

H. ROBERTS, Assistant Examiner

U.S. Cl. X.R.

260—77.5, 79.3, 79.5, 85.1, 93.5, 94.7, 874, 879, 880, 886